(12) United States Patent
Borba

(10) Patent No.: US 8,544,894 B1
(45) Date of Patent: Oct. 1, 2013

(54) RECREATIONAL VEHICLE WASTE HOSE COUPLING ASSEMBLY

(76) Inventor: David M. Borba, Hanford, CA (US)

( * ) Notice: Subject to any disclaimer, the term of this patent is extended or adjusted under 35 U.S.C. 154(b) by 137 days.

(21) Appl. No.: 13/328,096

(22) Filed: Dec. 16, 2011

(51) Int. Cl.
*F16L 17/00* (2006.01)

(52) U.S. Cl.
USPC ............................................ 285/97; 141/287

(58) Field of Classification Search
USPC .......... 285/97, 338; 141/287, 312; 137/899; 277/605, 644, 645–646
See application file for complete search history.

(56) References Cited

U.S. PATENT DOCUMENTS

| | | | | |
|---|---|---|---|---|
| 672,475 | A | * | 4/1901 | Cavallaro ........................ 166/67 |
| 2,015,081 | A | * | 9/1935 | McElhany et al. ............ 285/242 |
| 2,178,494 | A | * | 10/1939 | Richardson ................... 141/390 |
| 2,306,160 | A | * | 12/1942 | Freyssinet .................... 277/605 |
| 2,908,299 | A | * | 10/1959 | Gosselin ....................... 141/287 |
| 3,190,679 | A | * | 6/1965 | Lester .............................. 285/8 |
| 3,805,857 | A | * | 4/1974 | Johnson et al. ............... 141/287 |
| 3,830,267 | A | * | 8/1974 | Cass .............................. 141/287 |
| 4,023,518 | A | * | 5/1977 | Fahrner ........................ 114/244 |
| 4,216,981 | A | * | 8/1980 | Jensen ............................ 285/97 |
| 4,223,702 | A | | 9/1980 | Cook |
| 4,554,949 | A | | 11/1985 | Sell |
| 5,023,959 | A | * | 6/1991 | Mercer ............................ 4/321 |
| 5,247,974 | A | | 9/1993 | Sargent et al. |
| D375,786 | S | | 11/1996 | Morris |
| 6,601,852 | B1 | * | 8/2003 | Kogler et al. ................. 277/314 |
| 6,802,343 | B2 | | 10/2004 | Faahs |
| 7,013,922 | B2 | | 3/2006 | Thum |
| 2004/0112448 | A1 | | 6/2004 | Faahs |

* cited by examiner

*Primary Examiner* — Aaron Dunwoody

(57) ABSTRACT

A recreational vehicle waste hose coupling assembly includes a coupler including a sleeve that has a first end wall, a second end wall, an inner wall and an outer wall. An inflation space is defined between the inner and outer walls. A tube has a receiving end and an insertion end and the tube is fixedly positioned within the sleeve. An air pump is fluidly coupled to an air line. The air pump is actuated to inflate the sleeve to frictionally engage the outer wall with an inner surface of a sewer pipe. A feed pipe has an inflow end, an outflow end and a bend between the inflow and outflow ends. The inflow end is removably positionable within a recreational vehicle waste hose. The outflow end is removably positionable within the receiving end.

5 Claims, 5 Drawing Sheets

RECREATIONAL VEHICLE WASTE HOSE COUPLING ASSEMBLY

BACKGROUND OF THE DISCLOSURE

Field of the Disclosure

The disclosure relates to recreational vehicle waste hose coupling devices and more particularly pertains to a new recreational vehicle waste hose coupling device for coupling a recreational vehicle waste hose to a sewer pipe.

SUMMARY OF THE DISCLOSURE

An embodiment of the disclosure meets the needs presented above by generally comprising a coupler including a sleeve that has a first end wall, a second end wall, an inner wall and an outer wall. An inflation space is defined between the inner and outer walls. The first end wall has a pump aperture extending therethrough to fluidly access the inflation space. The sleeve may be comprised of a resiliently stretchable material. A tube has a receiving end and an insertion end and the tube is fixedly positioned within the sleeve. The tube may be comprised of a rigid and fluid impermeable material. An air pump is fluidly coupled to an air line. The air line extends through the pump aperture and is in fluid communication with the inflation space. The air pump is actuated to inflate the sleeve to frictionally engage the outer wall with an inner surface of a sewer pipe. A feed pipe has an inflow end, an outflow end and a bend between the inflow and outflow ends. The inflow end is removably positionable within a recreational vehicle waste hose. The outflow end is removably positionable within the receiving end.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF THE DRAWINGS

The disclosure will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
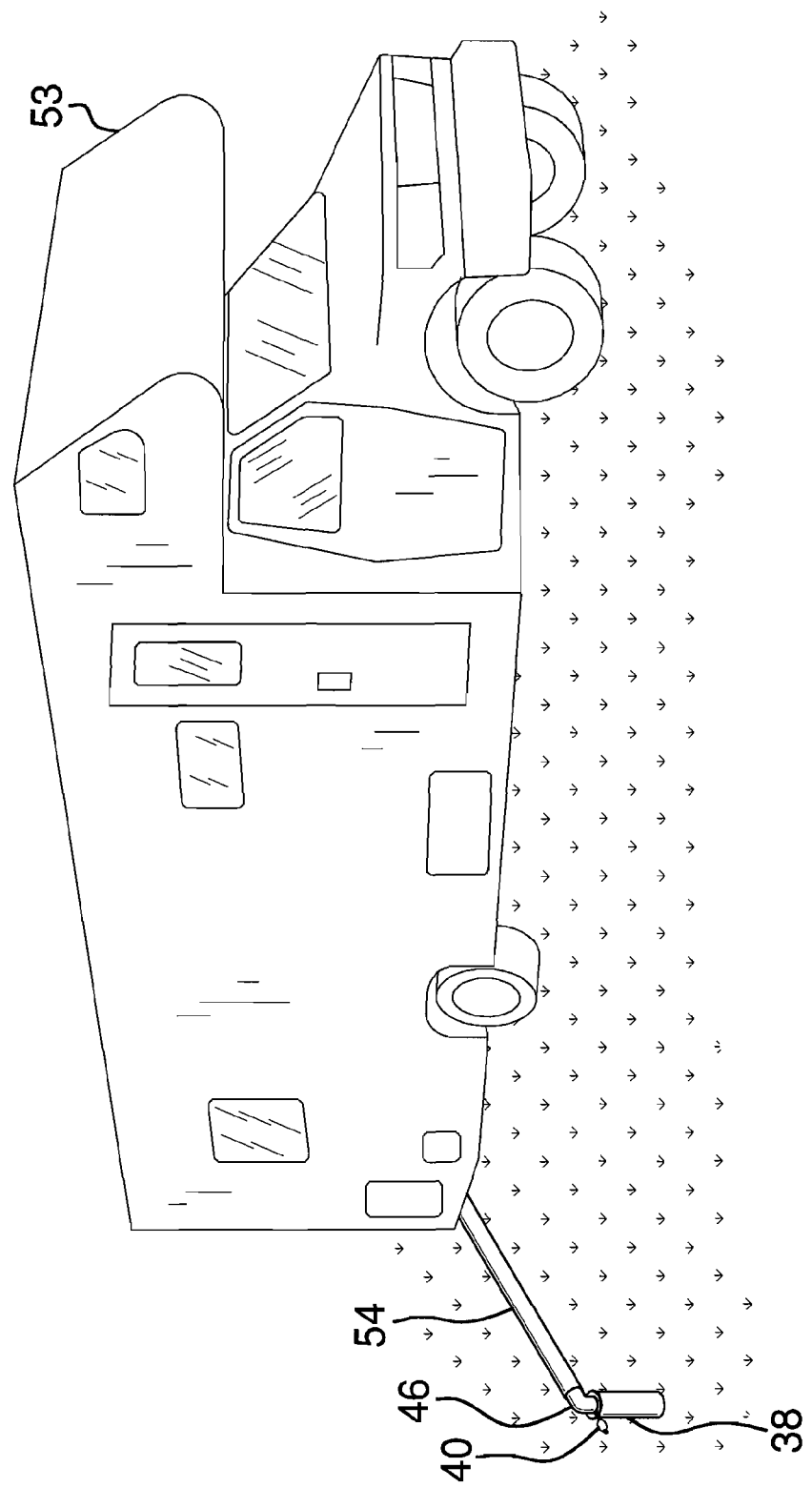
FIG. 1 is an in-use view of a recreational vehicle waste hose coupling assembly according to an embodiment of the disclosure.
Figure 2:
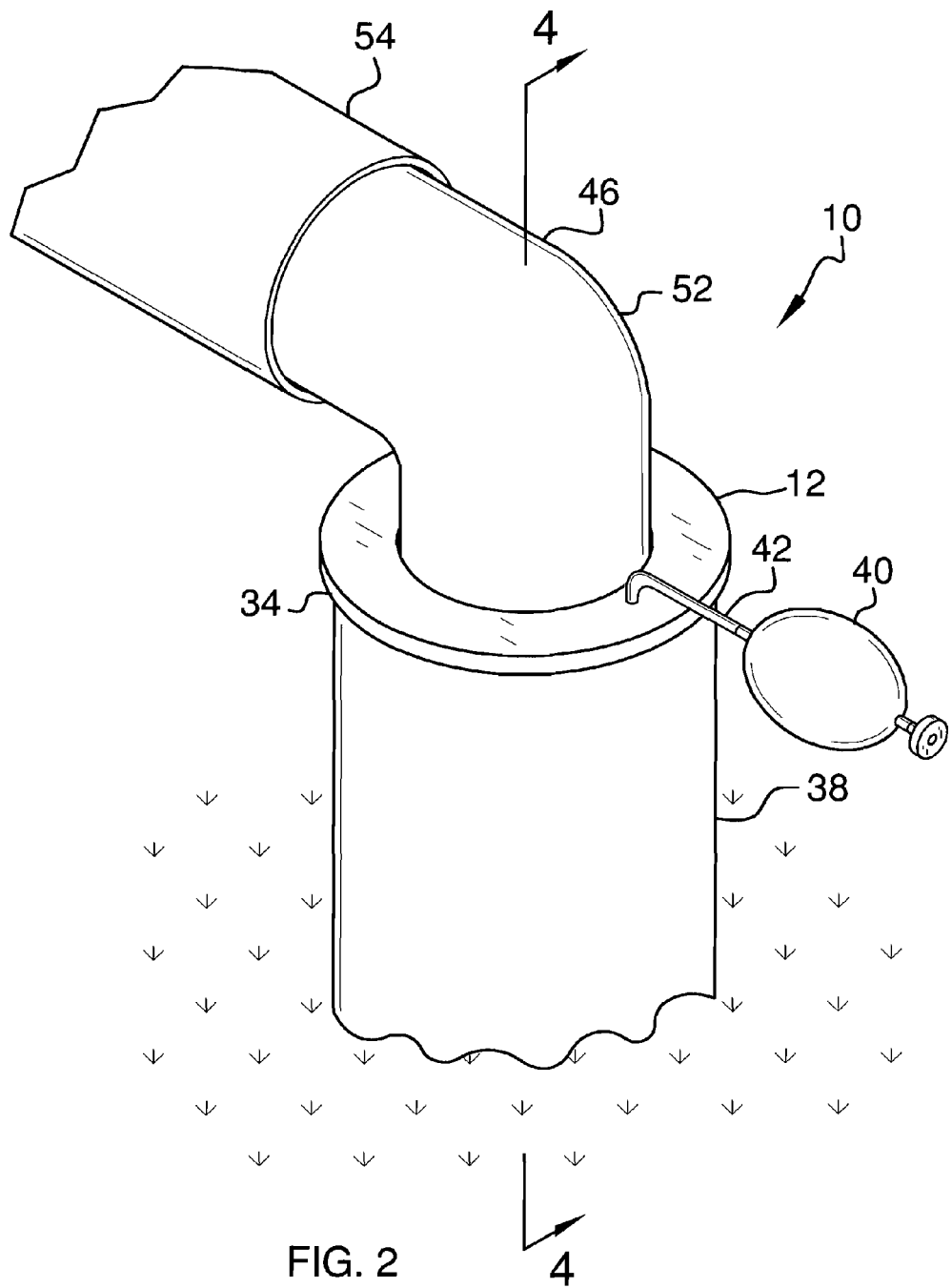
FIG. 2 is a top side perspective in-use view of an embodiment of the disclosure.
Figure 3:
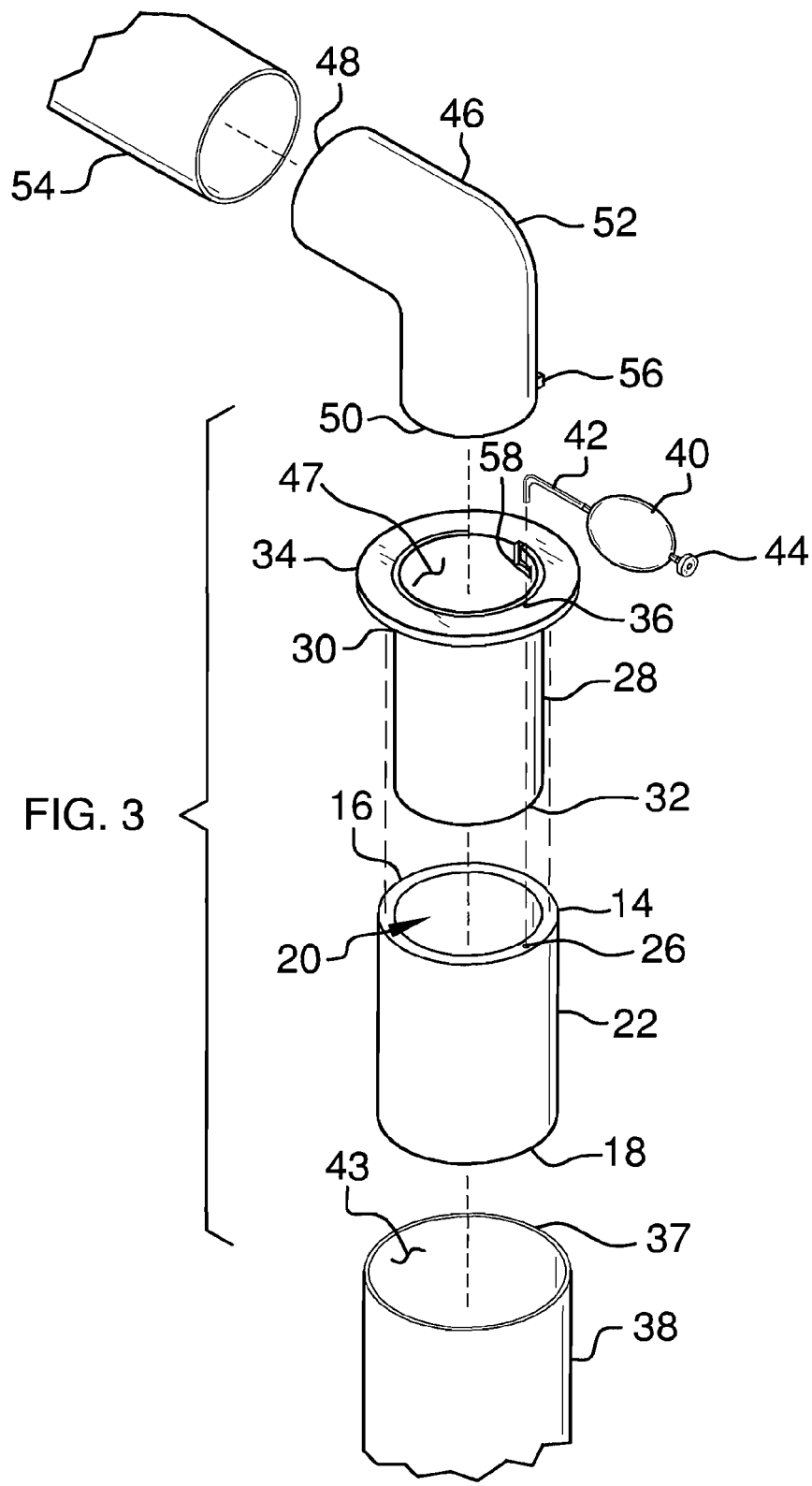
FIG. 3 is an exploded view of an embodiment of the disclosure.
Figure 4:
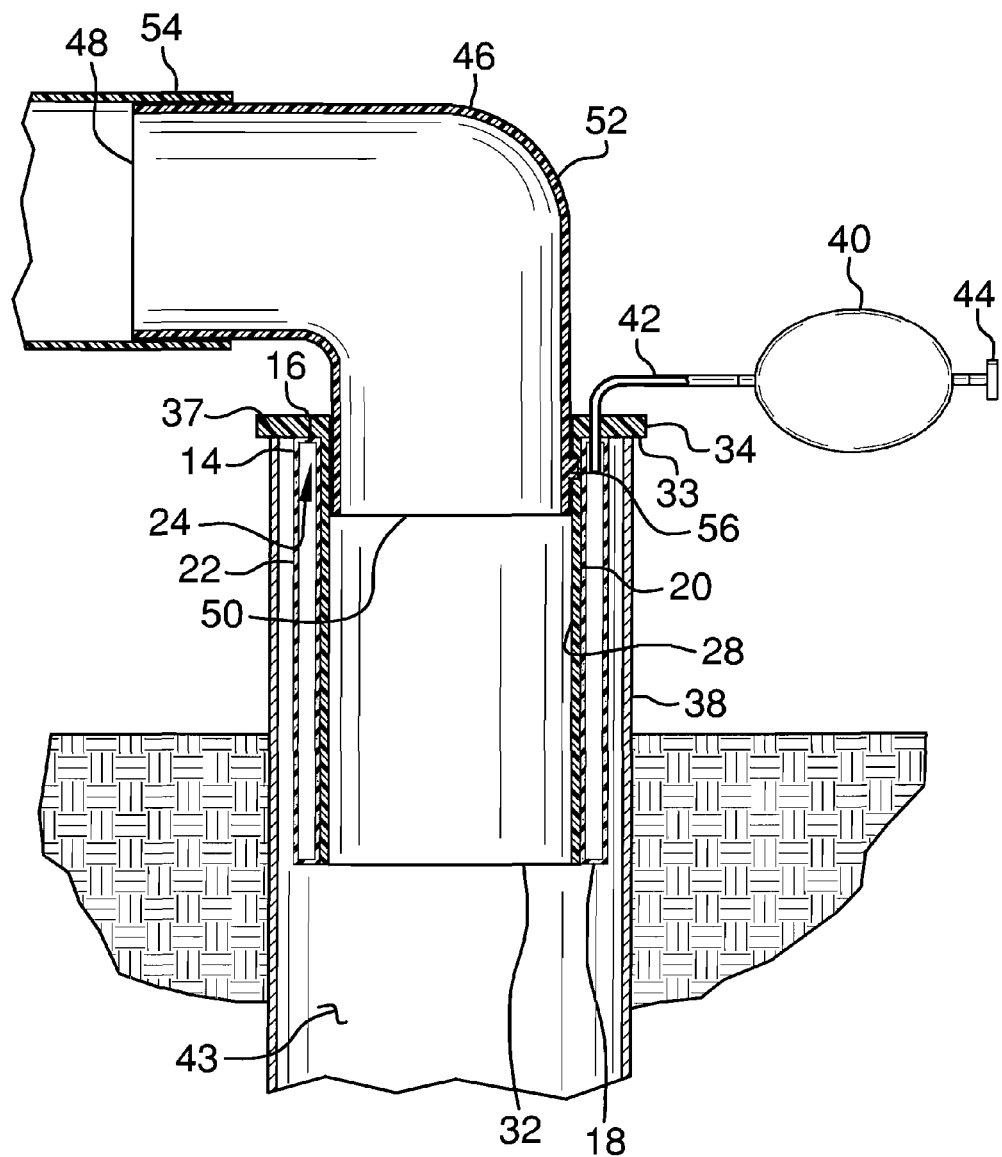
FIG. 4 is a cross-sectional view taken along line 4-4 of FIG. 2 of an embodiment of the disclosure.
Figure 5:
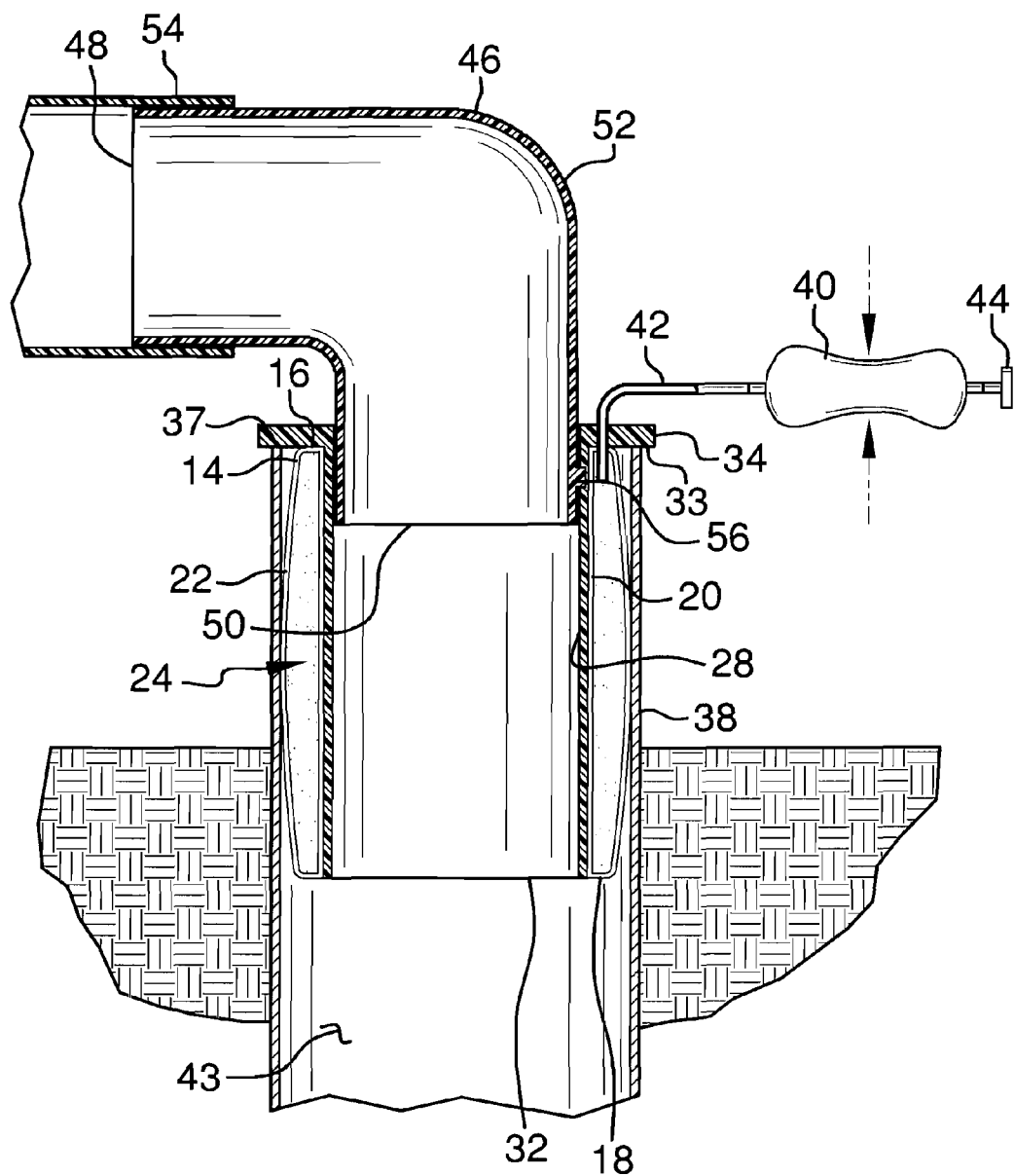
FIG. 5 is an additional cross-sectional view taken along line 4-4 of FIG. 2 of an embodiment of the disclosure.

With reference now to the drawings, and in particular to FIGS. 1 through 5 thereof, a new recreational vehicle waste hose coupling device embodying the principles and concepts of an embodiment of the disclosure and generally designated by the reference numeral 10 will be described.

As best illustrated in FIGS. 1 through 5, the recreational vehicle waste hose coupling assembly 10 generally comprises a coupler 12 including a sleeve 14 that has a first end wall 16, a second end wall 18, an inner wall 20 and an outer wall 22. An inflation space 24 is defined between the inner 20 and outer 22 walls. The first end wall 16 has a pump aperture 26 extending therethrough to fluidly access the inflation space 24. The sleeve 14 may be comprised of a resiliently stretchable material such as rubber or other similar material.

A tube 28 has a receiving end 30 and an insertion end 32. A flange 34 is coextensively attached to and extends outwardly from the receiving end 30 and the flange 34 has a pump conduit 36 extending therethrough. The tube 28 is fixedly positioned within the sleeve 14 so the first end wall 16 abuts a bottom side 33 of the flange 34. The inner wall 20 may be adhered to the tube 28 or may be attached in a similar, permanent manner. The pump conduit 36 is aligned with the pump aperture 26. The flange 34 may extend outwardly from the receiving end 30 a minimum of 1 inch to allow the bottom side 33 of the flange 34 to also abut a top edge 37 of a sewer pipe 38. The tube 28 may be comprised of a rigid and fluid impermeable material such as polyvinyl chloride or other similar material.

An air pump 40 is fluidly coupled to an air line 42. The air pump 40 may comprise a hand operated, compressible, ovoid bulb. Further, the air pump 40 may be comprised of a resiliently compressible material such as rubber or other similar material. The air line 42 extends from an end of the air pump 40 through the pump aperture 26 and the pump conduit 36 and is in fluid communication with the inflation space 24. The air line 42 may be comprised of a rigid material such as tin or other similar material though plastics or rubber materials may be utilized as well. The air pump 40 may be actuated to inflate the sleeve 14 to frictionally engage the outer wall 22 with an inner surface 43 of the sewer pipe 38.

An air release valve 44 is fluidly coupled to the air pump 40. The air release 44 valve may be actuated to deflate the sleeve 14 for removal of the sleeve 14 and the tube 28 from the sewer pipe 38. The air release valve 44 may extend from the air pump 40 on an opposite end from which the air line 42 extends. The air release valve 44 may be rotated in a first direction to allow air to escape the sleeve 14 and may be rotated in a second direction to restrict air flow from the sleeve 14.

A feed pipe 46 has an inflow end 48, an outflow end 50 and a bend 52 between the inflow 48 and outflow 50 ends. The inflow end 48 is removably positionable within a recreational vehicle 53 waste hose 54. The outflow end 50 is removably positionable within the receiving end 30. The feed pipe 46 is mechanically coupled to an interior surface 47 of the tube 28. The feed pipe 46 may have a tab 56 that engages a channel 58 in the interior surface 47 adjacent to the receiving end 30. The feed pipe 46 may be comprised of a rigid and fluid impermeable material such as polyvinyl chloride or other similar material.

In use, the coupler 12 may be inserted into a sewer pipe 38. The air pump 40 may be actuated to inflate the sleeve 14 to frictionally engage the outer wall 22 with the inner surface 43 of the sewer pipe 38. The outflow end 50 may be inserted into the receiving end 30 and the feed pipe 46 may be mechanically coupled to the tube 28. The inflow end 48 may be inserted into the recreational vehicle 53 waste hose 54. The air release valve 44 may be rotated in the first direction to deflate the sleeve 14 for removal of the coupler 12 from the sewer pipe 38.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure.

I claim:

1. A recreational vehicle waste hose coupling assembly configured for coupling a recreational vehicle waste hose to a sewer pipe, said assembly comprising:
   a coupler including;
      a sleeve having a first end wall, a second end wall, an inner wall and an outer wall, an inflation space being defined between said inner and outer walls, said first end wall having a pump aperture extending therethrough to fluidly access said inflation space, said sleeve being comprised of a resiliently stretchable material;
      a tube having a receiving end and an insertion end, said tube being fixedly positioned within said sleeve, said tube being comprised of a rigid and fluid impermeable material;
      an air pump being fluidly coupled to an air line, said air line extending through said pump aperture and being in fluid communication with said inflation space, said air pump being actuated to inflate said sleeve to frictionally engage said outer wall with an inner surface of a sewer pipe; and
   a feed pipe having an inflow end, an outflow end and a bend between said inflow and outflow ends, said inflow end being removably positionable within a recreational vehicle waste hose, said outflow end being removably positionable within said receiving end.

2. The assembly according to claim 1, further including a flange being coextensively attached to and extending outwardly from said receiving end, said flange having a pump conduit extending therethrough, said first end wall abutting a bottom side of said flange, said pump conduit being aligned with said pump aperture, said air line extending through said pump aperture and said pump conduit.

3. The assembly according to claim 1, further including an air release valve being fluidly coupled to said pump, said air release valve being actuated to deflate said sleeve for removal of said sleeve and said tube from said sewer pipe.

4. The assembly according to claim 1, wherein said feed pipe is mechanically coupled to an interior surface of said tube.

5. A recreational vehicle waste hose coupling assembly configured for coupling a recreational vehicle waste hose to a sewer pipe, said assembly comprising:
   a coupler including;
      a sleeve having a first end wall, a second end wall, an inner wall and an outer wall, an inflation space being defined between said inner and outer walls, said first end wall having a pump aperture extending therethrough to fluidly access said inflation space, said sleeve being comprised of a resiliently stretchable material;
      a tube having a receiving end and an insertion end, a flange being coextensively attached to and extending outwardly from said receiving end, said flange having a pump conduit extending therethrough, said tube being fixedly positioned within said sleeve, said first end wall abutting a bottom side of said flange, said pump conduit being aligned with said pump aperture, said tube being comprised of a rigid and fluid impermeable material;
      an air pump being fluidly coupled to an air line, said air line extending through said pump aperture and said pump conduit and being in fluid communication with said inflation space, said air pump being actuated to inflate said sleeve to frictionally engage said outer wall with an inner surface of a sewer pipe;
      an air release valve being fluidly coupled to said pump, said air release valve being actuated to deflate said sleeve for removal of said sleeve and said tube from said sewer pipe; and
   a feed pipe having an inflow end, an outflow end and a bend between said inflow and outflow ends, said inflow end being removably positionable within a recreational vehicle waste hose, said outflow end being removably positionable within said receiving end, said feed pipe being mechanically coupled to an interior surface of said tube.

* * * * *